United States Patent Office 3,684,438
Patented Aug. 15, 1972

3,684,438
PURIFICATION OF PHOSPHORIC ACID
Robert Joseph Gleason, Iselin, N.J., assignor to FMC Corporation, New York, N.Y.
No Drawing. Filed Nov. 5, 1970, Ser. No. 87,291
Int. Cl. C01b 25/18, 25/22
U.S. Cl. 423—321
5 Claims

ABSTRACT OF THE DISCLOSURE

A process for purifying wet phosphoric acid or raffinate acid resulting from the purification of wet acid, said process comprising mixing said impure acid with a blend of methyl and isopropyl alcohols in order to precipitate the impurities and recover the purified acid.

BACKGROUND OF THE INVENTION

One well known process for recovering the phosphate values from a phosphatic ore in the form of phosphoric acid is the "wet acid" process. In this process, a phosphate rock which generally contains phosphorus in the form of $Ca_{10}F_2(PO_4)_6$ is acidulated with a mineral acid, normally sulfuric acid, to precipitate the calcium value and recover phosphoric acid. The resultant wet acid is recovered by filtering it from these various insolubles in the acidulate mixture and is suitable for use in most fertilizer applications without further treatrent. The applicability of the resulting acid is, however, limited because of its relatively high impurity level which stems from the large amounts of impurities dissolved in the crude acid which accompany it through its normal processing stages. The most prevalent impurities are iron, aluminum, calcium, sodium, potassium, magnesium, fluorine, silica, sulphur and assorted organic matter.

Accordingly, it has been customary to purify wet acid intended for use in non-fertilizer applications A typical procedure involves liquid extraction with various solvents in order to effect the desired purification of the crude acid. Among such solvents are included: alkyl phosphates, aryl phosphates or alkyl aryl phosphates diluted with an organic solvent; diisopropyl ether; and amines or amine salts dissolved in an oragnic diluent. These extraction procedures generate at least two grades of phosphoric acid, the relatively pure acid and an impure raffinate acid. The raffinate acid, needless to say, contains most of the impurities originally in the wet acid and may contain up to 30 to 50% of the starting phosphate. Furthermore, the raffinate acid is super saturated with respect to some of the impurities and consequently exhibits post-precipitation characteristics. In view of the high impurity level of the rafinate and its post-precipitation characteristics, the marketability of this acid is extremely limtied and hence few attempts have been made to purify it.

As previously indicated, since the raffinate contains valuable components, it is desirable to develop a procedure for purifying the acid. Such purifying techniques as neutralization, ion exchange, solvent extraction and freezing have been tried, but only with limited success. Thus, for example, one solvent extraction procedure produces a mixture of sulphuric and phosphoric acids and is thus tied in with the wet acid sulphuric acid acidulation system. Neutralization of the raffinate with a base precipitates the impurities as the metallic phosphates and fluorides and accordingly losses of $P_2O_5$ which exceed 20% can be anticipated. Furthermore, the product is an alkali phosphate rather than a purified phosphoric acid.

SUMMARY OF THE INVENTION

It is the primary object of this invention to reduce the impurity level of raffinate acid obtained from wet acid purification process.

It is a further object to purify the raffinate to the extent that it may be useful in fertilizer production.

It is still another object to provide a purification procedure which can be used equally as well for the original wet acids.

Various other objects and advantages of this invention will be apparent from the following description thereof.

It has now been found that the impure raffinate acid generated by a partial extraction of phosphate from wet process phosphoric acid as well as the original phosphoric acid product can be purified by precipitation of the impurities therein. Thus, the precipitation of impurities results from the mixing of the impure phosphoric acid with a specific blend of methanol and isopropanol. Recovery of the purified raffinate yields a product acid of sufficient purity to be used in the production of liquid or solid fertilizer products.

Furthermore, the novel process of this invention overcomes the disadvantages inherent in the prior art purification techniques. Of great importance, this novel process works directly to extract and purify the raffinate acid as well as the original wet acid. Thus, for purposes of this invention, the term "impure phosphoric acid" is meant to include both the wet acid product and the raffinate acid.

DESCRIPTION OF THE PREFERRED EMBODIMENTS

The novel process of this invention involves mixing the impure phosphoric acid with a blend of methanol and isopropanol, stirring the resulting mix at a temperature of approximately 25 to 35° C., filtering the resulting precipitate and recovering the purified phosphoric acid.

With regard to the proportions applicable to this process, the weight ratio of alcohol blend to impure acid will generally range between 1:1 and 2:1, while the weight ratio of methanol to isopropanol in the alcohol blend will generally range between 1:3 and 1:1 with 1:3 being the preferred weight ratio. It is important to maintain the appropriate ratio of alcohol to acid inasmuch as if the ratio is substantially reduced, the amount of precipitation drops significantly and, correspondingly, the degree of purification is reduced. While weight ratios of alcohol blend to impure acid greater than 2:1 can be used, the disadvantages incurred by the greater amount of alcohol which has to be distilled generally outweigh the increased product purity.

Likewise, the weight relationship between the methanol and the isopropanol should be maintained in order to acquire the optimum amount of purification. Thus, as the amount of methanol is increased beyond the specified ratio, the amount of precipitation decreases and the ease and quality of the filtration is reduced.

It is also to be noted that both alcohols are required in order to accomplish the novel purification process of this invention. Thus, were either pure methanol or pure isopropanol mixed with the impure acid, very little purification would occur. For example, the use of pure methanol results in almost a total lack of impurity precipitation. Likewise, the use of pure isopropanol results in the formation of a viscous solution with a gelatinous precipitate, thereby making filtration of the impurities almost totally impossible. It is thus seen that the mixture of alcohols produces a synergistic effect whereby the impurity precipitation, i.e. the purification, with the alcohol blend is significantly greater than that achieved with either alcohol individually.

The precipitate which forms during the process is filtered from the mixture of acid and alcohols, with the alcohols being recovered from the phosphoric acid by any standard distillation technique, e.g. vacuum distillation. The economy of the process may be improved by recycling of the recovered alcohols.

With regard to purification of the raffinate acid, it is noted that substantially all of the alcohol is removed from the acid phase when the phosphate contained therein reaches approximately 54% $P_2O_5$. The alcohol treatment of the raffinate acid produces a semi-pure acid. The quality of this acid is such that it is useful in fertilizer applications. For example, the purified raffinate can be mixed with fresh wet acid to produce either diammonium phosphate or granular triple superphosphate.

The following examples further illustrate the embodiment of this invention. All parts given in these examples are by weight unless otherwise noted.

EXAMPLE I

This example illustrates the novel purification process of this invention.

The raffinate acid utilized in this example exhibited the following component analysis:

Percent—

| | |
|---|---|
| $P_2O_5$ | 45.28 |
| $SO_3$ | 4.5–5.0 |
| Al | 0.62 |
| Mg | 1.33 |
| Fe | 2.40 |
| F | 0.78 |

P.p.m.—

| | |
|---|---|
| Ca | 155 |
| Si | 520 |

Thus, 100 parts of this raffinate acid was slowly mixed with an alcohol blend of 50 parts methanol and 150 parts isopropanol. The mixture was agitated for a period of 10 to 15 minutes at a temperature of 30° C. whereupon filtration of the precipitate yielded 51 parts of wet cake. The cake was thereafter washed with water and dried at 100° C.

The purified acid, the filter cake and the wash solution were thereafter analyzed in order to determine the effectiveness of the mixed alcohol purification procedure. The results of these analyses are presented in the following table:

| | Raffinate composition | Treated raffinate [1] | Composition of precipitate [2] | Wash solution composition |
|---|---|---|---|---|
| Percent $P_2O_5$ | 45.28 | 60.9 | 45.6 | 7.88 |
| Percent $SO_3$ | 4.5–5.0 | 3.98 | 4.36 | 0.84 |
| Percent Al | 0.62 | 0.35 | 2.6 | 0.16 |
| Percent Mg | 1.33 | 0.63 | 27.4 | 0.33 |
| Percent Fe | 2.40 | 1.23 | 10.0 | 0.39 |
| Percent F | 0.78 | .0204 | 0.63 | 0.083 |
| P.p.m. Ca | 155 | 19 | 0.10 | 33 |
| P.p.m. Si | 520 | 140 | 140 | 30 |
| Fraction $P_2O_5$ recovered, percent | | 80.1 | 9.1 | 11.8 |

[1] Raffinate after distillation of the MeOH and IPA.
[2] A white friable solid formed during drying.

The results presented hereinabove, clearly indicate the effectiveness of the novel process in purifying the raffinate acid. This effectiveness is particularly indicated by the 80% recovery of phosphate in the purified acid. It is further seen that the wash solution, on an equivalent $P_2O_5$ basis, contains about the same amount of impurities as the original raffinate acid. Consequently, it may be recycled to a further extraction.

EXAMPLE II

This example illustrates the desirability of adhering to the alcohol-raffinate concentrations specified hereinabove in order to accomplish the objectives of the novel process of this invention.

Thus, using the general procedure set forth in Example I, hereinabove, observations were made on various component mixtures of raffinate, methanol and isopropanol. The results of these determinations are noted in the following table:

Parts by weight mixed

| IPA/MeOH/raffinate | Observations |
|---|---|
| 150/50/100 | Good precipitate, good filterability, wet cake recovery—57% [1]. |
| 100/100/100 | Medium precipitate, cloudy filtrate, wet cake recovery—35.7%. |
| 50/50/100 | Light precipitation, slow filtration, wet cake recovery—4.12%. |
| 75/75/100 | Light precipitation, slow filtration, wet cake recovery—15.1%. |
| 100/34/100 | Slight precipitation, clear filtration, wet cake recovery—10.9%. |
| 50/150/100 | Poor filtration, cloudy filtrate, wet cake recovery—29.2%. |
| 100/0/100 | Gelatinous precipitate formed, black, tar-like substance developed. |
| 200/0/100 | No precipitate formation, development of milky appearance. |
| 0/200/100 | No precipitate formation. |

[1] Equation:

$$\text{Wet cake recovery (percent)} = \frac{\text{grams wet cake}}{\text{grams raffinate acid used}} \times 100$$

The results summarized above clearly indicate the desirability of maintaining the weight ratio of alcohol to raffinate between 1:1 and 2:1 and the weight ratio of methanol to isopropanol between 1:3 and 1:1 in order to obtain maximum purification of the raffinate acid. These results also indicate the necessity for utilizing a blend of methanol and isopropanol in the purification procedure.

EXAMPLE III

The following test procedure was conducted in order to demonstrate the stability of the alcohol blend under process conditions.

Thus, a mixture of 150 parts isopropanol and 50 parts methanol were charged into a sealed flask and 100 parts of the raffinate acid added slowly thereto under agitation. Upon completion of the precipitation, 50 parts of water were added to the flask and the contents were then subjected to vacuum distillation.

Gas chromatographic analysis of the distillate and residue showed a recovery of 48.8 parts methanol and 150.8 parts isopropanol. These figures reflect a substantially total recovery of the initial alcohol feed.

Summarizing, it is thus seen that this invention provides a novel process for the purification of impure phosphoric acid prepared by the wet acid procedure.

Variations may be made in procedures, proportions and materials without departing from the scope of the invention as defined by the following claims.

What is claimed is:

1. A process of purifying phosphoric acid which comprises contacting said acid with a blend of methyl and isopropyl alcohols in order to precipitate impurities therein, separating said acid-alcohol mixture from said precipitated impurities, and recovering a phosphoric acid product having a higher purity than the initial acid; said methyl and isopropyl alcohols being present in the alcohol blend in a weight ratio ranging from 1:3 to 1:1.

2. The process of claim 1, wherein said methyl and isopropyl alcohols are present in the alcohol blend in a weight ratio of 1:3.

3. The process of claim 1, wherein said alcohol blend and said impure phosphoric acid are present in a weight ratio ranging from about 1:1 to 2:1.

4. The process of claim 1, wherein said phosphoric acid is obtained by acidulation of phosphatic ores.

5. The process of claim 1, wherein said phosphoric acid is the raffinate acid generated by a partial extraction of phosphate from wet process phosphoric acid.

References Cited

UNITED STATES PATENTS

| | | | |
|---|---|---|---|
| 2,885,265 | 5/1959 | Cunningham | 23—165 |
| 3,556,739 | 1/1971 | Baniel et al. | 23—312 |

FOREIGN PATENTS

| | | | |
|---|---|---|---|
| 1,129,793 | 10/1968 | Great Britain | 23—165 |
| 173,727 | 12/1934 | Switzerland | 23—165 |
| 4,328,005 | 3/1968 | Japan | 23—165 |

EARL C. THOMAS, Primary Examiner

G. A. HELLER, Assistant Examiner